United States Patent
Franssen et al.

(10) Patent No.: US 10,526,544 B2
(45) Date of Patent: Jan. 7, 2020

(54) PROCESS FOR CONVERTING A BIOMASS-DERIVED PYROLYSIS OIL, METHOD FOR PREPARING A CATALYST, AND A CATALYST

(71) Applicant: SHELL OIL COMPANY, Houston, TX (US)

(72) Inventors: Nicole Maria Gerarda Franssen, Amsterdam (NL); Marcello Stefano Rigutto, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 66 days.

(21) Appl. No.: 15/110,109

(22) PCT Filed: Jan. 8, 2015

(86) PCT No.: PCT/EP2015/050235
§ 371 (c)(1),
(2) Date: Jul. 7, 2016

(87) PCT Pub. No.: WO2015/104320
PCT Pub. Date: Jul. 16, 2015

(65) Prior Publication Data
US 2016/0333274 A1 Nov. 17, 2016

(30) Foreign Application Priority Data

Jan. 8, 2014 (EP) .................................. 14150488

(51) Int. Cl.
| C10G 3/00 | (2006.01) |
| B01J 37/04 | (2006.01) |
| B01J 23/72 | (2006.01) |
| B01J 23/755 | (2006.01) |
| B01J 37/08 | (2006.01) |

(52) U.S. Cl.
CPC ................ *C10G 3/45* (2013.01); *B01J 23/72* (2013.01); *B01J 23/755* (2013.01); *B01J 37/04* (2013.01); *B01J 37/08* (2013.01); *C10G 3/48* (2013.01); *C10G 3/50* (2013.01); *C10G 2300/1011* (2013.01); *C10G 2300/1014* (2013.01); *C10G 2300/70* (2013.01); *Y02P 30/20* (2015.11)

(58) Field of Classification Search
CPC .... C10G 3/45; C10G 3/47; B01J 23/72; B01J 23/755; B01J 37/04; B01J 37/08; B01J 37/00; B01J 23/70
USPC ....................................... 585/357
See application file for complete search history.

(56) References Cited

U.S. PATENT DOCUMENTS

| 4,876,108 A | 10/1989 | Underwood et al. |
| 5,395,455 A | 3/1995 | Scott et al. |
| 5,961,786 A | 10/1999 | Freel et al. |
| 7,928,273 B2* | 4/2011 | Bradin ...................... C10G 2/32 44/601 |
| 8,178,468 B2* | 5/2012 | Bhan ......................... C10L 1/04 502/305 |
| 2008/0312476 A1* | 12/2008 | McCall ................... C10G 45/02 568/954 |
| 2009/0177021 A1* | 7/2009 | Reynolds ................ B01J 29/084 585/468 |
| 2011/0119994 A1* | 5/2011 | Hogendoorn .......... C10G 45/06 44/307 |
| 2015/0314282 A1* | 11/2015 | Bhan ..................... B01J 35/1042 208/216 PP |

FOREIGN PATENT DOCUMENTS

| WO | 199934917 | 7/1999 | |
| WO | 2008122636 | 10/2008 | |
| WO | 2011064172 | 6/2011 | |
| WO | 2012030215 | 3/2012 | |
| WO | WO 2012030215 A1 * | 3/2012 | ............ B01J 23/002 |
| WO | 2013063219 | 5/2013 | |
| WO | 2013064563 | 5/2013 | |

OTHER PUBLICATIONS

Rouquerol et al.; "Recommendations for the characterization of porous solids (Technical Report)"; Pure & Appl. Chem 66 (8); pp. 1739-1758; 1994.
Wang; "Effect of acid, alkali, and steam explosion pretreatment on characteristics of bio-oil produced from pinewood"; Energy Fuels; vol. 25; pp. 3758-3764; 2011.
Oasmaa et al.; "Fast pyrolysis of Forestry Residue 1. Effect of extractives on phase separation of pyrolysis liquids"; Energy & Fuels; vol. 17, No. 1; pp. 1-12; 2003.
Oasmaa et al.; "Fast pyrolysis bio-oils from wood and agricultural residues"; Energy & Fuels; vol. 24; pp. 1380-1388; 2010.
International Search Report for PCT/EP2015/050235 dated Apr. 2, 2015; 3 pages.

* cited by examiner

*Primary Examiner* — Philip Y Louie
*Assistant Examiner* — Jason Y Chong

(57) ABSTRACT

A process for converting a biomass-derived pyrolysis oil in which the pyrolysis oil is contacted with hydrogen in the presence of a certain catalyst containing one or more Group VIII metals is provided. The catalyst is prepared by (a) comulling (1) a refractory oxide, (2) a small amount of liquid, chosen such that the Loss On Ignition (LOI) at 485° C. of the mixture is from equal to or more than 20 wt % to equal to or less than 70 wt % based on the total weight of the catalyst composition, and (3) at least one or more metal component(s), which is/are at least partially insoluble in the amount of liquid used, to form a mixture, and the metal component(s) is/are one or more Group VIII metal component, (b) optionally shaping, and drying of the mixture thus obtained; and (c) calcining the composition thus obtained to provide a calcined catalyst.

21 Claims, No Drawings

PROCESS FOR CONVERTING A BIOMASS-DERIVED PYROLYSIS OIL, METHOD FOR PREPARING A CATALYST, AND A CATALYST

PRIORITY CLAIM

The present application is the National Stage (§ 371) of International Application No. PCT/EP2012/050235, filed Jan. 8,2015, which claims priority from European Patent Application No. 14150488.6, filed Jan. 8, 2014 incorporated herein by reference.

TECHNICAL FIELD OF THE INVENTION

The present invention relates to a process for converting a biomass-derived pyrolysis oil using mechanically strong catalysts with a high loading of the active metal(s) prepared by co-mulling of (a) partially insoluble metal compound(s), a small amount of liquid, and a refractory oxide, prior to shaping, drying and calcining. The invention further relates to said catalyst and a method for preparing the same.

BACKGROUND TO THE INVENTION

With the diminishing supply of crude petroleum oil, use of renewable biomass as an energy source is becoming increasingly important for the production of liquid fuels and/or chemicals. The use of renewable biomass as an energy source may also allow for a more sustainable production of liquid fuels and more sustainable $CO_2$ emissions that may help meet global $CO_2$ emissions standards under the Kyoto protocol.

The fuels and/or chemicals from renewable biomass are often referred to as biofuels and/or biochemicals. Biofuels and/or biochemicals derived from non-edible biomass materials, such as cellulosic materials, are preferred as these do not compete with food production. These biofuels and/or biochemicals are also referred to as second generation or advanced biofuels and/or biochemicals. Most of these non-edible biomass materials, however, are solid materials that are cumbersome to convert into liquid fuels.

A well-known process to convert solid biomass material into a liquid is pyrolysis. By means of such pyrolysis of a solid biomass material a biomass-derived pyrolysis oil can be obtained. The energy density of the obtained pyrolysis oil is higher than that of the original solid biomass material. This has logistic advantages as it makes the pyrolysis oil more attractive for transport and/or storage than the original solid biomass material. Pyrolysis oils, however, can be less stable than conventional petroleum oils during storage and transport. Some of the compounds within the pyrolysis oil can react with each other during transport and/or storage and an undesired sludge may form. In order to improve the quality of biomass-derived pyrolysis oil, several manners of hydroprocessing have been suggested.

WO2011064172 describes a process including pyrolysis of biomass to obtain a pyrolysis oil and hydro-deoxygenation of this pyrolysis oil at a temperature in the range from 200 to 400° C. with a catalyst that may for example comprise metals of Group VIII and/or Group VIB of the Periodic Table of Elements. It is mentioned that the catalyst may possibly comprise nickel, copper and/or alloys or mixtures thereof, such as Ni—Cu on a catalyst carrier. Examples of carriers mentioned include alumna, amorphous silica-alumina, titania, silica and zirconia. As an example of suitable catalysts Ni—Cu/ZrO2 is mentioned.

WO2012/030215 describes a process for the hydrotreatment of vegetal biomass. It mentions that fast pyrolysis may be an attractive technology to transform difficult-to-handle biomass into a clean and uniform liquid, called pyrolysis oil. It further mentions that several processes have been proposed for upgrading the pyrolysis oil including hydrogenation under hydrogen pressure, catalytic cracking and high pressure thermal treatment. WO2012/030215 subsequently mentions that a problem with the catalysts known from the conventional refinery processes, such as nickel/molybdenum or cobalt/molybdenum on alumina supports, is that they are not meant to handle high water contents, whilst high water contents are common in pyrolysis oils. WO2012/030215 alleges that known catalysts will decay under reaction conditions, where a large amount of water is present and rather high temperatures are applied; and that the formation of coke may cause parts of the porous catalysts, prepared by impregnation of active metals on a porous support, to become inaccessible to the reactant, leading to quick catalyst inactivation as the catalyst support disintegrates, leaching of active components into the water and clogging of catalyst pores and or clogging of the reactor. According to WO2012/030215, there is a need for an improved catalyst and process for treating biomasses and a specific catalyst is claimed which is prepared by mixing hydrated metal oxides and a $NH_3$ aqueous solvent, adding a solution of a $C_1$-$C_6$ alkyl silicate in a $C_1$-$C_6$ alkyl alcohol; impregnating with ZrO $(NO_3)_2.2H_2O$ and $La(NO_3)_3.6H_2O$ in water; drying the obtained product; and calcining the product at a temperature in the range from 350° C. to 900° C. WO2012/030215 states that the catalysts described therein are more effective in the hydrogenation of pyrolysis biomasses. The catalyst proposed in WO2012/030215, however, is too expensive to be used in a scaled up—commercial scale—conversion plant. Preparation of the catalyst as described in WO2012/030215 would require too large volumes of tetraalkylorthosilicates (in WO2012/030215 referred to as $C_1$-$C_6$ alkylsilicates, e.g. ethylsilicate), making the catalyst and process uneconomical. In addition, the presence of $C_1$-$C_6$-alkyl alkanols, such as ethanol, during the preparation of a catalyst as proposed in WO2012/030215 is undesirable. Ethanol is volatile, flammable, toxic and potentially carcinogenic and for all these reasons difficult to handle in a catalyst manufacturing environment.

It would therefore be an advancement in the art to provide a catalyst and process for converting a biomass-derived pyrolysis oil that would be more economical whilst still maintaining a good catalyst activity and avoiding any safety risks.

SUMMARY OF THE INVENTION

It has now been found that a safe and cheaper but still sufficiently active and stable catalyst for the conversion of a biomass-derived pyrolysis oil can be provided, when the catalyst is produced by means of a so-called co-mulling technique which comprises mixing the catalyst components with a relatively small amount of liquid.

Accordingly, the present invention provides a process for converting a biomass-derived pyrolysis oil in which the pyrolysis oil is contacted with hydrogen in the presence of a catalyst, comprising the following steps:
i) preparing a catalyst containing at least one or more Group VIII metal(s), preferably in an amount of equal to or more than 12 wt %, more preferably equal to or more than 16 wt %, even more preferably equal to or more than 18 wt %, most preferably equal to or more than 20 wt %, to equal to or less than 80 wt %, more preferably to equal to or less than 65 wt % based on the total weight of the catalyst, by a method comprising (a) comulling (1) a refractory oxide, (2) a small amount of liquid, chosen such that the Loss On Ignition (LOI) at 485° C. of the mixture is from equal to or more than 20 wt % to equal to or less than 70 wt % based on the total weight of the catalyst composition, and (3) at least one or more metal component(s), which is/are at least partially insoluble in the amount of liquid used, to form a mixture, wherein the metal component(s) is/are at least one or more Group VIII metal component;

(b) optionally shaping, and drying of the mixture thus obtained; and (c) calcination of the composition thus obtained to provide a calcined catalyst; and ii) contacting a feed containing the biomass-derived pyrolysis oil with hydrogen at a temperature in the range from 50° C. to 350° C. in the presence of the catalyst prepared in step i).

The process according to the invention may conveniently result in a stabilized biomass-derived pyrolysis oil. The biomass-derived pyrolysis oil may further have a reduced oxygen content.

The catalyst used in the present process advantageously may not have the disadvantages as mentioned above for prior art catalysts. Further, the catalyst used in the present invention displays high catalytic activities.

The hydroprocessed biomass-derived pyrolysis oil may optionally be dewatered and further converted via one or more hydrocarbon conversion processes into one or more fuel components and/or one or more chemical components. The one or more fuel components and/or one or more chemical components may be blended with one or more other components to produce a biofuel and/or biochemical.

In addition, the present invention provides a method for preparing a catalyst containing at least one or more Group VIII metals, comprising the steps of (a) comulling (1) a refractory oxide, (2) a small amount of liquid, chosen such that the Loss On Ignition (LOI) at 485° C. of the mixture is from equal to or more than 20 wt % to equal to or less than 70 wt % based on the total weight of the catalyst composition, and (3) at least one or more metal component(s), which is/are at least partially insoluble in the amount of liquid used, to form a mixture, wherein the metal component(s) is/are at least one or more Group VIII metal component;

(b) optionally shaping, and drying of the mixture thus obtained; and (c) calcination of the composition thus obtained to provide a calcined catalyst, wherein at least one Group VIII metal is Ni in an amount of equal to or more than 12 wt %, more preferably equal to or more than 16 wt %, even more preferably equal to or more than 18 wt %, most preferably equal to or more than 20 wt %, to equal to or less than 80 wt %, more preferably to equal to or less than 65 wt % based on the total weight of the catalyst based on the total weight of the catalyst and wherein such method further comprises comulling in step (a) one or more Group IB metal component(s), preferably copper or a copper component, into the mixture.

The catalyst obtained pursuant to such a method is believed to be also novel and inventive in itself and hence the present invention also provides a catalyst obtainable by a method as described above. Such a catalyst comprises Ni and optionally one or more Group VIII metals or metal components and further one or more Group IB metal component(s), preferably copper or a copper component; a refractory oxide selected from the group consisting of titania, zirconia, silica and mixtures thereof, which catalyst comprises Ni in an amount of equal to or more than 12 wt %, more preferably equal to or more than 16 wt %, even more preferably equal to or more than 18 wt %, most preferably equal to or more than 20 wt %%, to equal to or less than 80 wt %, more preferably to equal to or less than 65 wt % based on the total weight of the catalyst based on the total weight of the catalyst.

DETAILED DESCRIPTION OF THE INVENTION

By a biomass-derived pyrolysis oil is herein understood a pyrolysis oil obtained or obtainable by pyrolysis of a biomass material. In a preferred embodiment the process according to the invention may comprise an additional step of providing such a biomass-derived pyrolysis oil. Such a step may comprise pyrolyzing of a biomass material to produce a biomass-derived pyrolysis oil. By biomass material is herein understood a composition of matter of biological origin as opposed to a composition of matter obtained or derived from petroleum, natural gas or coal. Without wishing to be bound by any kind of theory it is believed that such biomass material may contain carbon-14 isotope in an abundance of about 0.0000000001%, based on total moles of carbon. The biomass material may suitably comprise animal fat, tallow and/or solid biomass material.

Preferably the biomass material is a solid biomass material. More preferably the biomass material is material containing cellulose and/or lignocellulose. Such a material containing "cellulose" respectively "lignocellulose" is herein also referred to as a "cellulosic", respectively "lignocellulosic" material. By a cellulosic material is herein understood a material containing cellulose and optionally also lignin and/or hemicellulose. By a lignocellulosic material is herein understood a material containing cellulose and lignin and optionally hemicellulose.

Examples of biomass materials include aquatic plants and algae, agricultural waste and/or forestry waste and/or paper waste and/or plant material obtained from domestic waste.

Examples of cellulosic or lignocellulosic material include for example agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust and bark; waste paper; sugar processing residues such as bagasse and beet pulp; or mixtures thereof.

More preferably the solid biomass material comprises or consists of a cellulosic or lignocellulosic material selected from the group consisting of wood, sawdust, bark, straw, hay, grasses, bagasse, corn stover and/or mixtures thereof. The wood may include soft wood and/or hard wood.

When the biomass material is a solid biomass material such as for example a lignocellulosic material, it may suitably be washed, steam exploded, dried, roasted, torrefied and/or reduced in particle size before being pyrolyzed. In addition, if the biomass material is a cellulosic or lignocellulosic material it may preferably be demineralized before being pyrolyzed. During such a demineralization amongst others chloride may be removed.

By pyrolysis or pyrolyzing is herein understood the decomposition of the biomass material, in the presence or in the essential absence of a catalyst, at a temperature of equal to or more than 380° C.

Preferably pyrolysis is carried out in an oxygen-poor, preferably an oxygen-free, atmosphere. By an oxygen-poor atmosphere is understood an atmosphere containing equal to or less than 10 vol. % oxygen, preferably equal to or less than 5 vol. % oxygen and more preferably equal to or less than 1 vol. % oxygen. By an oxygen-free atmosphere is understood an atmosphere where oxygen is essentially absent. More preferably pyrolysis is carried out in an atmosphere containing equal to or less than 2 vol. % oxygen, more preferably equal to or less than 0.1 vol. % oxygen and most preferably equal to or less than 0.05 vol. % oxygen. In a most preferred embodiment pyrolysis is carried out in the essential absence of oxygen.

The biomass material is preferably pyrolyzed at a pyrolysis temperature of equal to or more than 400° C., more preferably equal to or more than 450° C., even more preferably equal to or more than 500° C. and most preferably equal to or more than 550° C. The pyrolysis temperature is further preferably equal to or less than 800° C., more preferably equal to or less than 700° C. and most preferably equal to or less than 650° C.

The pyrolysis pressure may vary widely. For practical purposes a pressure in the range from 0.01 to 0.5 MPa (MegaPascal), more preferably in the range from 0.1 to 0.2 MPa is preferred. Most preferred is an atmospheric pressure (about 0.1 MPa).

In one embodiment the pyrolysis does not include an externally added catalyst. In another embodiment the pyrolysis is a so-called catalytic pyrolysis wherein a catalyst is used. Examples of suitable catalysts in such a catalytic pyrolysis include mesoporous zeolites. By a mesoporous zeolite is herein preferably understood a zeolite containing pores with a pore diameter in the range from 2-50 nanometer, in line with IUPAC notation (see for example Rouquerol et al. (1994). "Recommendations for the characterization of porous solids (Technical Report)" *Pure & Appl. Chem* 66 (8): 1739-1758). Especially preferred catalysts for such a catalytic pyrolysis include ZSM-5 type zeolites, such as for example Zeolyst 5524G and 8014 and Albemarle UPV-2.

In certain embodiments, chemicals may be employed for a pretreatment of the biomass material, or catalysts may be added to the pyrolysis mixture, cf. for example, H Wang cs., "Effect of acid, alkali, and steam explosion pretreatment on characteristics of bio-oil produced from pinewood", Energy Fuels (2011) 25, p. 3758-3764.

In a preferred pyrolysis process, generally referred to as a flash pyrolysis process, the biomass is rapidly heated (for example within 3 seconds) in the essential absence of oxygen to a temperature in the range of from 400° C. to 600° C. and kept at that temperature for a short period of time (for example equal to or less than 3 seconds). Such flash pyrolysis processes are known, for example from A. Oasmaa et al, "Fast pyrolysis of Forestry Residue 1. Effect of extractives on phase separation of pyrolysis liquids", Energy & Fuels, volume 17, number 1, 2003, pages 1-12; and A. Oasmaa et al, Fast pyrolysis bio-oils from wood and agricultural residues, Energy & Fuels, 2010, vol. 24, pages 1380-1388; U.S. Pat. Nos. 4,876,108; 5,961,786; and 5,395,455.

In another preferred pyrolysis process a solid heating medium is used, such as for example silica or sand. The solid heating medium may for example be a fluidized solid heating medium provided in for example a fluidized bed or a riser reactor. In such a pyrolysis process the biomass material may be fluidized within the fluidized solid heating medium and subsequently the biomass material may be pyrolysed with the heat provided by such fluidized solid heating medium. Hereafter any residual coke formed on the solid heating medium may be burned off to regenerate the solid heating medium. The coke that is burned off may conveniently supply the heat needed to prehead the solid heating medium.

During such pyrolysis of the biomass material a biomass-derived pyrolysis oil is produced. The biomass-derived pyrolysis oil used in the process according to the invention may comprise or consist of part of the product of such pyrolysis of the biomass material. The biomass-derived pyrolysis oil may for example be separated from the remainder of the pyrolysis product (including gases and solids) by any manner known to be suitable for such purpose by one skilled in the art, including for example filtration, flashing etc.

The biomass-derived pyrolysis oil may include for example one or more hydrocarbons (compounds comprising or consisting of hydrogen and carbon), carbohydrates, olefins, paraffins, oxygenates and residual water. By an oxygenate is herein understood a compound containing carbon, hydrogen and oxygen. The oxygenates may for example include aldehydes, carboxylic acids, ethers, esters, alkanols, phenols and ketones.

The biomass-derived pyrolysis oil may suitably further still comprise water therein. Such water may for example be present in a dispersed and/or emulsified form. For example, the biomass-derived pyrolysis oil may suitably comprise water in an amount equal to or more than 0.1 wt %, preferably equal to or more than 1 wt %, more preferably equal to or more than 2 wt %, even more preferably equal to or more than 5 wt %, still more preferably equal to or more than 10 wt % and most preferably equal to or more than 15 wt % water and preferably equal to or less than 55 wt %, more preferably equal to or less than 45 wt %, and still more preferably equal to or less than 35 wt %, still more preferably equal to or less than 30 wt %, most preferably equal to or less than 25 wt % water, based on the total weight of the biomass-derived pyrolysis oil. In practice, the biomass-derived pyrolysis oil may suitable comprise in the range from 1 to 55 wt % water, more suitably in the range from 10 to 45 wt % water, most suitably in the range from 15 to 35 wt % water, based on the total weight of the biomass-derived pyrolysis oil.

As used herein, water content is as measured by ASTM E203. Such water may preferably be removed before or after carrying out the hydroprocessing as described herein below.

According to step (a) of the catalyst preparation method of the present invention, the catalyst according to the present invention is produced using a so-called co-mulling technique.

Often catalysts are being prepared by impregnation of a porous carrier with one or more soluble metal salt(s) and a quantity of a solvent, followed by drying, calcination and optionally activation. In the case of pore impregnation of a porous carrier, it will usually be possible to start with a mechanical strong extrudate. However, the maximum metal loading that can be obtained by a single impregnation step is restricted by the pore volume of the carrier and the solubility of the metal salt. In practice, several impregnation steps are needed to obtain the desired quantity of metal. The need for such a number of steps is undesirable for the preparation of catalysts on a commercial scale.

According to the present invention, it has been found that it is favourable to use certain specific catalysts in a process for converting a biomass-derived pyrolysis oil, which catalysts are mechanically strong catalysts with a high loading of the active metal(s) and have an excellent performance. Such catalysts can be prepared by a relatively simple process:

co-mulling of (a) partially insoluble metal compound(s), a small amount of liquid, and a refractory oxide, prior to shaping, drying and calcining. In EP1042067 such a process is described.

The liquid as used in the production of the catalyst may be any of suitable liquids known in the art, for example water, ammonia, alcohols (such as methanol, ethanol and propanol), ketones (such as acetone), aldehydes (such as propanal) and aromatic solvents (such as toluene). A most convenient and preferred liquid is water.

The amount of the liquid used is suitably chosen such that the Loss On Ignition (LOI) at 485° C. of the mixture is from equal to or more than 20 wt % to equal to or less than 70 wt % based on the total weight of the catalyst composition, preferably from equal to or more than 25 wt % to equal to or less than 65 wt % and more preferably from equal to or more than 30 wt % to equal to or less than 60 wt %. In particular for the embodiments where water is used as the liquid, it is noted that the other ingredients of the catalyst may also contain water in various forms (e.g. physically adsorbed water, crystal water, water bound in hydroxide). Instead of specifying the total amount of water that is present in a catalyst composition, it is therefore common and unambiguous to quantify the Loss On Ignition at a certain temperature (i.e. 485° C.). LOI is in fact the total content of water in the above forms, plus e.g. $CO_2$ released from carbonates, plus volatiles and combustibles.

The solids content of the mixture formed in step (a) of the preparation method of the invention may be up to 90% by weight based on the total catalyst mixture.

In step i) of the process according to the invention a catalyst is prepared, preferably containing one or more Group VIII metals in an amount of equal to or more than 12 wt % based on the total weight of the catalyst. Based on the desired amount of Group VIII metal(s) and the type of Group VIII metal component used, a person skilled in the art may calculate the amount of Group VIII metal component(s) required.

By a Group VIII metal is herein understood a metal from Group VIII of the Periodic System of Elements pursuant to the Chemical Abstracts Service (CAS) notation. Examples of such Group VIII metals include metals from Groups 8, 9 and 10 pursuant to the IUPAC notation. Preferably the one or more Group VIII metal components include one or more Group VIII metals chosen from the Group consisting of Iron, Cobalt, nickel, Ruthenium, Rhodium, Palladium, Iridium and Platinum. More preferably the one or more Group VIII metals are non-noble Group VIII metals, such as Iron, Cobalt and/or nickel. Most preferably the Group VIII metal is nickel and most preferably the Group VIII metal component comprises a nickel hydroxide or oxide component.

In addition, the presence of one or more Group IB metals in the catalyst may be advantageous. Such one or more Group IB metals may act as a promoter. Hence, in a preferred embodiment the above process step i) and/or the above method includes preparing a catalyst comprising mixing one or more Group VIII metal component(s) with at least one or more Group IB metal component(s).

The Group IB promoter metal(s) or precursor(s) thereof may be added at any stage of the preparation process in the form of soluble or insoluble promoter metal compounds. Suitable promoter metal compounds are metallic powders, hydroxides, oxides, (organic acid) salts and mixtures thereof. The amount of promoter metal in the catalyst or catalyst precursor may vary widely.

In an embodiment of the invention, in the process, method and/or catalyst of the invention the weight ratio of the at least one or more Group VIII metal component(s) to the least one or more Group IB metal component(s) is at least 2:1, preferably at least 5:1, particularly up to 15:1.

By a Group IB metal is herein understood a metal from Group IB of the Periodic System of Elements pursuant to the Chemical Abstracts Service (CAS) notation. Examples of such Group IB metals include metals from Group 11 pursuant to the IUPAC notation. Preferably the one or more Group IB metal components include one or more Group IB metals chosen from the Group consisting of copper, silver and gold. Most preferably the Group IB metal is copper and most preferably the Group IB metal component comprises a copper carbonate, a copper hydroxide or a copper hydroxide carbonate (e.g. $Cu_2(OH)_2CO_3$ or $Cu_3(OH)_2(CO_3)_2$) component or mixtures thereof.

Preferably the catalyst comprises essentially no Group VIB metal(s). By a Group VIB metal is herein understood a metal from Group VIB of the Periodic System of Elements pursuant to the Chemical Abstracts Service (CAS) notation. Examples of such Group VIB metals include metals from Group 6 pursuant to the IUPAC notation. For example Group VIB metals include molybdenum and tungsten. Most preferably the above process step i) and/or the above method is/are carried out in the essential absence of a Group VIB metal. Hence, preferably the catalyst used according to the present invention does not comprise any Group VIB metal components. Group VIB metals such as molybdenum and tungsten may require a sulfide form to be sufficiently active. Due to the high oxygen content of the pyrolysis oil, however, such a sulfide form of any Group VIB metal may be converted to the oxide form. This may lead to inactivation and/or destabilization of the catalyst.

The above mentioned metal components, such as the Group VIII metal component(s) and/or Group IB metal component(s) may be provided in any manner known to be suitable by the person skilled in the art. For example, each of the metal component(s) may independently be a metal oxide, a metal salt or elemental metal. By an elemental metal is herein understood a metal present in its elemental form. By a metal oxide is herein understood a metal in its oxidized form, such as for example a nickel-oxide or copper-oxide. By a metal salt is herein understood a salt of a metal. Examples include metal carbonates, metal citrates, metal silicates, metal phosphates, metal acetates, metal hydroxides, metal nitrates, metal sulfates, metal formiates and mixtures thereof. Metal carbonates are especially preferred. Preferably each metal component mentioned above independently is a metal oxide or a metal salt.

Preferably the one or more Group VIII metal component(s) is/are selected from the group consisting of nickel carbonate, nickel oxide, nickel hydroxide, nickel phosphate, nickel formiate, nickel sulfate, nickel nitrate, nickel citrate, nickel acetate, or a mixture of two or more thereof. Particularly preferred are nickel oxide, nickel hydroxide, nickel hydroxide carbonates (e.g. $Ni_4CO_3(OH)_6(H_2O)_4$) or a mixture thereof. Most preferably the above process step i) and/or the above method comprise mixing nickel hydroxide or nickel oxide.

Preferably the one or more Group IB metal component(s) is/are selected from the group consisting of copper carbonate, copper oxide, copper hydroxide, copper phosphate, copper citrate, copper formiate, copper sulfate, copper nitrate, copper acetate or a mixture of two or more thereof. In particular preferred are copper hydroxide and copper carbonate or a mixture or complex structure of the two. Most preferably the above process step i) and/or the above method comprise mixing a copper carbonate, a copper hydroxide carbonate or copper hydroxide or mixtures thereof.

In suitable process of producing the catalyst, any metal component of which at least 5% by weight is insoluble in the amount of the liquid used, can be suitably used. Preferably, at least 10% by weight of the metal component is insoluble in the amount of liquid used, more preferably at least 15% by weight, still more preferably at least 20% by weight.

To improve the flow properties of the mixture produced in process step i) and/or the method as mentioned above, it is preferred to include one or more flow improving agents and/or extrusion aids in the mixture. Suitable additives for inclusion in the mixture include fatty amines, quaternary ammonium compounds, polyvinyl pyridine, sulphoxonium, sulphonium, phosphonium and iodonium compounds, alkylated aromatic compounds, acyclic carboxylic acids (such as citric acid), fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, cellulose derivatives (such as hydroxymethylcellulose), polyols (such as polyvinylalcohol) and acetylenic glycols. The extrusion aids are preferably chosen from the group consisting of citric acid, polyvinylalcohol, hydroxymethylcellulose and/or mixtures thereof. In a preferred embodiment, each of the extrusion aids citric acid, polyvinylalcohol and hydroxymethylcellulose are used.

Suitably the flow improving agents and/or the extrusion aids are mixed in the metal/refractory oxide mixture in weight percentages between 0.5% and 5% relative to the mass of the dry oxide carrier. Preferably the total weight percentage of extrusion aids relative to the oxide carrier is from 0.5% to 15%, more preferably from 1% to 10%, even more preferably equal to or less than 7%, and most preferably equal to or less than 5%. In a preferred embodiment, the extrusion aids citric acid, polyvinylalcohol and hydroxymethylcellulose are used, each in a weight percentages of 1% relative to the mass of the dry oxide carrier.

A refractory oxide as used according to the invention is preferably selected from the group consisting of titania, zirconia, silica, precursors thereof, and mixtures thereof. Titania and/or zirconia is/are especially preferred as it may render the catalyst more acid-resistant and/or corrosion-resistant. The most preferred refractory oxide is titania. The titania for inclusion in the mixture may comprise up to 20% by weight of another refractory oxide, typically silica or zirconia, or a clay as a binder material, preferably up to 10% by weight based on the total weight of refractory oxide and binder material. Preferably, the titania has been prepared in the absence of sulphur containing compounds. An example of such preparation method involves flame hydrolysis of titanium tetrachloride. Titania is available commercially and is well-known as material for use in the preparation of catalysts or catalyst precursors. The titania suitably has a surface area of from 0.5 to 200 m2/g, more preferably of from 20 to 150 m2/g. As an alternative or in addition to titania, the mixture may comprise a titania precursor. Titania may be prepared by heating titania hydroxide. As the heating progresses, titania hydroxide is converted via a number of intermediate forms and the successive loss of a number of water molecules into titania. For the purpose of this specification, the term "titania precursor" is to be taken as a reference to titania hydroxide or any of the aforementioned intermediate forms.

Preferably the refractory oxide contains essentially no alumina. More preferably the catalyst as a whole contains essentially no alumina. That is, the catalyst is preferably an alumina-free catalyst. Without wishing to be bound by any kind of theory it is believed that a refractory oxide and/or catalyst without alumina may advantageously be more resistant to acidic and/or corrosive components that may be present in a bio-mass derived pyrolysis oil. In addition a refractory oxide and/or catalyst without alumina may be less prone to deactivation and/or disintegration in the presence of any water that may be contained in a biomass-derived pyrolysis oil. Hence, a catalyst which does not include alumina, may advantageously be more stable and/or deactivate less quickly than an alumina containing catalyst when used in hydroprocessing a biomass-derived pyrolysis oil.

The catalyst preferably comprises in the range from equal to or more than 5 wt % to equal to or less than 95 wt %, more preferably in the range from equal to or more than 20 wt % to equal to or less than 94 wt % of the one or more refractory oxides, based on the total weight of the catalyst.

Preferably the refractory oxide has a BET surface area in the range from equal to or more than 10 $m^2$/gram to equal to or less than 1000 $m^2$/gram, more preferably in the range from equal to or more than 40 $m^2$/gram to equal to or less than 450 $m^2$/gram, even more preferred in the range from equal to or more than 15 $m^2$/gram to equal to or less than 300 $m^2$/gram, in particular in the range from equal to or more than 20 $m^2$/gram to equal to or less than 200 $m^2$/gram, and especially in the range from equal to or more than 25 $m^2$/gram to equal to or less than 100 $m^2$/gram.

During the mixing step (a) pressures applied are preferably equal to or less than 0.5 MegaPascal (corresponding to equal to or less than about 5 bar). More preferably the mixing is carried out at ambient pressure (corresponding to a pressure of about 0.1 MegaPascal, i.e. about 1 bar).

Typically, in the mixing step (a) the ingredients of the mixture are mulled for a period of from 5 to 120 minutes, preferably from 15 to 90 minutes. Any suitable, commercially available mulling machine may be employed. During the mulling process, energy is put into the mixture by the mulling apparatus. As a result of the energy input into the mixture during the mulling process, there will be a rise in temperature of the mixture during mulling. The mulling process may be carried out over a broad range of temperatures, preferably in the range from equal to or more than 15° C. to equal to or less than 100° C., more preferably equal to or less than 80° C. Most preferably the mixing in step (a) is carried out at room temperature (about 20° C.)

It will be appreciated that the mixture obtained in step (a) may not be of the desired size and shape. Thus, a shaping step may be required to prepare the catalyst or catalyst precursor. Shaping techniques are well known to those skilled in the art and include pelletising, granulating, crushing, extrusion and spraydrying.

In an embodiment of the invention, the solids content of the mixture obtained in step (a) of the catalyst preparation method is relatively high, and said mixture is subsequently shaped preferably by extrusion. In such embodiment the solids content of the mixture is typically in the range of from 30 to 90% by weight, preferably of from 50 to 80% by weight.

Extrusion, if applicable, may be effected using any conventional, commercially available extruder. In particular, a screw-type extruding machine may be used to force the mixture through the orifices in a suitable dieplate to yield extrudates of the desired form. The strands formed upon extrusion may be cut to the desired length.

In another embodiment of the invention, the solids contents of the mixture obtained in step (a) is such that a slurry or suspension is obtained, and the slurry or suspension thus-obtained is shaped and dried by spray-drying. The solids content of said slurry/suspension is typically in the range of from 1 to 30% by weight, preferably of from 5 to 20% by weight. The thus-obtained slurry or suspension is suitably shaped and dried by spray-drying.

Optionally, burn-out materials may be included in the mixture, prior to extrusion, in order to create macropores in the resulting extrudates. Suitable burnout materials are commonly known in the art. The total amount of flow-improving agents/extrusion aids and burn-out materials in the mixture preferably is in the range of from 0.1 to 20% by weight, more preferably from 0.5 to 10% by weight, on the basis of the total weight of the mixture.

The process of the present invention involves a drying step in step (b). Typically, the mixtures will be dried after shaping and before calcination. Optionally, shaping and drying can be combined in one step, for example by spray-drying. Alternatively, the mixture may be dried before shaping it, for example by drying a filter cake before crushing it. It will be appreciated that drying and calcining may be combined in one step.

Drying is effected at elevated temperature in the range of from equal to or more than 50° C. to equal to or less than 500° C., more preferably from equal to or more than 80° C. to equal to or less than 300° C., in particular from equal to or more than 100° C. to equal to or less than 180° C. and especially from equal to or more than 130 to equal to or less than 150° C. The drying period can include a period of time in the range from equal to or more than 10 minutes to equal to or less than 10 hours, more preferably in the range from equal to or more than 30 minutes to equal to or less than 6 hours, particularly in the range from equal to or more than 1 hour to equal to or less than 3 hours to prepare the catalyst composition.

The extruded and dried, spray-dried or otherwise shaped and dried catalyst compositions obtained in step (b) are subsequently calcined in step (c). Such calcining preferably comprises or consists of heating the catalyst composition to a temperature in the range from equal to or more than 400° C. to equal to or less than 750° C., preferably from equal to or more than 500° C. to equal to or less than 650° C. The duration of the calcination treatment is typically from 5 minutes to several hours, preferably from equal to or more than 15 minutes to 6 hours, particularly in the range from equal to or more than 1 hour to equal to or less than 3 hours. Suitably, the calcination treatment is carried out in an oxygen-containing atmosphere, preferably air. It will be appreciated that, optionally, the drying step and the calcining step can be combined.

The catalyst according to the invention may advantageously be used in hydroprocessing of a biomass-derived pyrolysis oil. In contrast to some of the prior art catalysts comprising molybdenum or tungsten the catalyst according to this invention advantageously does not require any activation by means of a sulfidation step. Hence, any contacting with any sulfidation agent such as hydrogen sulfide is not needed. Advantageously the catalyst according to this invention may be activated by the mere reduction with hydrogen. This allows the catalyst to be activated by its mere use. That is, the catalyst may for example be activated in-situ by reduction with hydrogen during any hydroprocessing of a biomass-derived pyrolysis oil. The present invention therefore also provides the use of a catalyst as described above for the hydroprocessing of any biomass-derived pyrolysis oil. Preferences for such hydroprocessing are as described below.

In process step ii) a feed containing the biomass-derived pyrolysis oil is contacted with hydrogen at a temperature in the range from 50° C. to 350° C. in the presence of the catalyst.

In step ii) the biomass-derived pyrolysis oil is converted to a converted biomass-derived pyrolysis oil. This step may also be referred to as a hydroprocessing step. The converted biomass-derived pyrolysis oil may suitably also be referred to as a hydroprocessed biomass-derived pyrolysis oil. Process step ii) may advantageously result in stabilizing and/or hydrodeoxygenation of the biomass-derived pyrolysis oil. This is explained in more detail below.

Process step ii) may comprise one or more hydroprocessing stages.

In one preferred embodiment, process step ii) comprises merely one stage, wherein a biomass-derived pyrolysis oil is stabilized by contacting it with hydrogen at a temperature in the range from 50° C. to 250° C. in the presence of the catalyst. This may allow one to prepare a so-called stabilized biomass-derived pyrolysis oil, which may be more suitable for transport and/or storage.

In another preferred embodiment, process step ii) comprises two or more sequential stages, wherein each subsequent stage is carried out at a higher temperature than its preceding stage.

More preferably process step ii) comprises a first hydroprocessing stage comprising contacting a feed containing the biomass-derived pyrolysis oil with hydrogen at a temperature in the range from 50° C. to 250° C. in the presence of the catalyst to prepare a partially hydroprocessed biomass-derived pyrolysis oil; and a second hydroprocessing stage comprising contacting the partially hydroprocessed biomass-derived pyrolysis oil with hydrogen at a temperature in the range from 150° C. to 350° C. in the presence of the catalyst to prepare a further hydroprocessed biomass-derived pyrolysis oil, where preferably the second hydroprocessing stage is carried out at a higher temperature than the first hydroprocessing stage. Such first hydroprocessing stage may advantageously allow the biomass-derived pyrolysis oil to be stabilized, whereas the second hydroprocessing stage may advantageously allow for a reduction of oxygen content of the biomass-derived pyrolysis oil.

Most preferably process step ii) comprises a stabilizing stage comprising contacting a feed containing the biomass-derived pyrolysis oil with hydrogen at a temperature in the range from 50° C. to 250° C. in the presence of the catalyst to prepare a stabilized biomass-derived pyrolysis oil; and a hydrodeoxygenation stage comprising contacting the stabilized biomass-derived pyrolysis oil with hydrogen at a temperature in the range from 150° C. to 350° C. in the presence of the catalyst to prepare an at least partially hydrodeoxygenated biomass-derived pyrolysis oil, where preferably the hydrodeoxygenation stage is carried out at a higher temperature than the stabilizing stage.

The stabilized biomass-derived pyrolysis oil may conveniently be stored and/or transported before being forwarded to the hydrodeoxygenation stage. Alternatively it is also possible for both the stabilizing stage as well as the hydrodeoxygenation stage to be carried out sequentially in time, in the same reactor or reactor(s).

Preferably the stabilized biomass-derived pyrolysis oil is at least partly hydrodeoxygenated in the hydrodeoxygenation stage. By at least partially hydrodeoxygenating is herein preferably understood that part or the whole of the oxygen-containing hydrocarbon compounds (also referred to as oxygenates) present in the biomass-derived pyrolysis oil are hydrodeoxygenated. That is, if a feed containing biomass-derived pyrolysis oil is partly hydrodeoxygenated some oxygenates will remain within the biomass-derived pyrolysis oil after the hydrodeoxygenation reaction. If a feed containing biomass-derived pyrolysis oil is wholly hydrodeoxygenated essentially no oxygenates will remain within the biomass-derived pyrolysis oil after the hydrodeoxygenation reaction.

Process step ii) may be carried out in any one or more reactor(s) known by the person skilled in the art to be suitable for such hydroprocessing reaction(s), for example a stirred autoclave, a reactor with one or more fixed catalyst beds, one or more reactors comprising a moving catalyst bed, one or more slurry reactors or one or more reactors comprising an ebullating catalyst bed or combinations of any one or more of such reactors.

Process step ii) is preferably carried out at a total pressure in the range from equal to or more than 0.1 MegaPascal (about 1 bar) to equal to or less than 40 MegaPascal (about 400 bar), in particular to equal or less than 25 MegaPascal (about 250 bar). Especially process step ii) is carried out at a total pressure in the range from equal to or more than 0.2 MegaPascal (about 2 bar) to equal to or less than 17 MegaPascal (about 170 bar).

Preferably step ii) of the process according to the invention is carried out such, that the converted biomass-derived pyrolysis oil obtained in the process according to the invention may advantageously have an oxygen content (on a dry basis) in the range from 5 wt % to 40 wt %, preferably 20 wt % to 35 wt %, based on the total weight of the converted biomass-derived pyrolysis oil. The oxygen content may suitably be determined by elemental analysis calculating the oxygen content as weight difference after determination and subtraction of carbon and hydrogen content.

In one embodiment the feed containing the biomass-derived pyrolysis oil used in step ii) of the process according to the invention may further comprise a petroleum-derived hydrocarbon composition. In such an embodiment, the petroleum-derived hydrocarbon composition may be co-processed alongside the biomass-derived pyrolysis oil. The presence of the petroleum-derived hydrocarbon composition may be advantageous as it may stabilize the biomass-derived pyrolysis oil during hydroprocessing in step ii).

When step ii) comprises a stabilizing stage and a hydrodeoxygenation stage, the petroleum derived hydrocarbon composition may be co-fed before the stabilizing stage; or after the stabilizing stage and before the hydrodeoxygenation stage.

The petroleum-derived hydrocarbon composition may comprise one or more hydrocarbon compounds and preferably comprises two or more hydrocarbon compounds. By a hydrocarbon compound is herein understood a compound containing hydrogen and carbon. Such hydrocarbon compound may further contain heteroatoms such as oxygen, sulphur and/or nitrogen. The petroleum-derived hydrocarbon composition may also comprise hydrocarbon compounds consisting of only hydrogen and carbon.

In a preferred embodiment, the C7-asphaltenes content of the petroleum-derived hydrocarbon composition may be equal to or more than 0.2% wt (percent by weight), more preferably equal to or more than 0.7% wt, still more preferably equal to or more than 2.0% wt, even more preferably in the range of from 0.8 to 30% wt, still even more preferably in the range of from 2.0% wt to 30% wt, based on the total weight of the petroleum-derived hydrocarbon composition. Most preferably the C7-asphaltenes content is in the range of from 0.9 to 15% wt or in the range of from 2.0 to 15% wt based on the total weight of the petroleum-derived hydrocarbon composition. As used herein, asphaltenes content or C7-asphaltenes content is as determined by IP143, using n-heptane as a solvent.

Suitable the petroleum-derived hydrocarbon composition has an initial atmospheric boiling point of equal to or more than 130° C. Preferably, the initial atmospheric boiling point of the petroleum-derived hydrocarbon composition is equal to or more than 150° C., more preferably equal to or more than 180° C. In preferred embodiments, the atmospheric boiling point range of the petroleum-derived hydrocarbon composition may be from 220° C. to 800° C., more preferably from 300° C. to 700° C. In preferred embodiments, the hydrogen to carbon weight ratio (H/C ratio) of the petroleum-derived hydrocarbon composition may be at most 0.15 w/w, more preferably in the range of from 0.1 to 0.14 w/w, even more preferably in the range of from 0.11 to 0.13 w/w.

As used herein, boiling point is the atmospheric boiling point, unless indicated otherwise, with the atmospheric boiling point being the boiling point as determined at a pressure of 100 kiloPascal (i.e. 0.1 MegaPascal). As used herein, initial boiling point and boiling point range of the high boiling hydrocarbon mixtures are as determined by ASTM D2887. As used herein, pressure is absolute pressure. As used herein, H/C ratio is as determined by ASTM D5291. As used herein, asphaltenes content or C7-asphaltenes content is as determined by IP143, using n-heptane as a solvent.

In a preferred embodiment the petroleum-derived hydrocarbon composition comprises shale oil, oil derived from oil sands, bitumen, a straight run (atmospheric) gas oil, a flashed distillate, a vacuum gas oil (VGO), a coker (heavy) gas oil, a diesel, a gasoline, a kerosene, a naphtha, a liquefied petroleum gas, an atmospheric residue ("long residue"), a vacuum residue ("short residue") and/or mixtures thereof. Most preferably the petroleum-derived hydrocarbon composition comprises an atmospheric residue or a vacuum residue. The petroleum-derived hydrocarbon composition may suitably also be derived from an unconventional oil resource such as oil shale or oil sands. For example the petroleum-derived hydrocarbon composition may comprise a pyrolysis oil derived from oil shale or oil sands.

In a preferred embodiment the petroleum-derived hydrocarbon composition may be mixed in a weight ratio of biomass-derived pyrolysis oil to petroleum-derived hydrocarbon composition (grams biomass-derived pyrolysis oil/grams petroleum-derived hydrocarbon composition) in the range from 1/99 to 30/70, more preferably in the range from 5/95 to 25/75, most preferably in the range from 10/90 to 20/80.

If so desired the biomass-derived pyrolysis oil obtained may suitably be dewatered before or after conversion in step ii) of the process according to the invention. Dewatering may for example be carried out by evaporating of the water; membrane separation; phase separation; absorption or adsorption of the water; and/or any combination thereof. When the biomass-derived pyrolysis oil is dewatered before conversion in step ii) of the process according to the invention, it may be convenient to carry out such dewatering in the presence of a petroleum derived hydrocarbon composition as described above. Further preferences for such a dewatering process may be found in WO2013064563, herein incorporated by reference.

The converted biomass-derived pyrolysis oil prepared in step ii) of the process according to the invention may be converted further via one or more hydrocarbon conversion processes into one or more fuel components and/or one or more chemical components.

The one or more hydrocarbon conversion processes may for example include a fluid catalytic cracking process, a hydrocracking process, a thermal cracking process, a hydro-isomerization process, a hydro-desulphurization process or any combination thereof.

In a preferred embodiment the reaction product or part thereof of any of the hydrocarbon conversion processes can subsequently be fractionated to produce one or more product fractions, for example a product fraction boiling in the gasoline range (for example from about 35° C. to about 210° C.); a product fraction boiling in the diesel range (for example from about 210° C. to about 370° C.); a product fraction boiling in the vacuum gas oil range (for example from about 370° C. to about 540° C.); and a short residue product fraction (for example boiling above 540° C.)

Any one or more product fractions obtained by fractionation may or may not be further hydrotreated or hydroisomerized to obtain a hydrotreated or hydroisomerized product fraction.

The, optionally hydrotreated or hydroisomerized, product fraction(s) may be used as biofuel and/or biochemical component(s).

In a preferred embodiment the, optionally hydrotreated or hydroisomerized, one or more product fractions produced in the fractionation can be blended as a biofuel component and/or a biochemical component with one or more other components to produce a biofuel and/or a biochemical. By a biofuel respectively a biochemical is herein understood a fuel or a chemical that is at least party derived from a renewable energy source.

Examples of one or more other components with which the, optionally hydrotreated or hydroisomerized, one or more product fractions may be blended include anti-oxidants, corrosion inhibitors, ashless detergents, dehazers, dyes, lubricity improvers and/or mineral fuel components, but also conventional petroleum derived gasoline, diesel and/or kerosene fractions.

The invention is illustrated by the following non-limiting example.

EXAMPLE

A mixture was prepared from P25 $TiO_2$, nickel hydroxide and copper basic carbonate powders in a ratio leading to an overall composition of 71.84 wt % $TiO_2$, 25.45 wt % NiO and 2.71 wt % CuO, on a dry oxide mass weight basis. To the mixture were further added citric acid (1 wt %), polyvinylalcohol (Mowiol, 1 wt %) and hydroxymethylcellulose (Methocel, 1 wt %) extrusion aids (the 1 wt % quantities are again relative to the mass of dry oxide), and demineralized water such that the total content of water plus combustibles of the mixture amounts to 35 wt % of total mass, as defined by the loss on ignition (LOI) at 485° C.

[Herein loss on ignition (LOI) for a material is the relative amount of lost mass upon heating the material to 485° C. following the procedure: The sample is mixed well to prevent any inhomogeneity. The weighed sample is transferred into a weighed and precalcined crucible. The crucible is placed to a preheated oven at 485° C. for a minimum time of 15 minutes, but typically for 1 hour. The crucible containing the dried sample is weighed again, and the LOI is determined according to the formula: LOI %=$(m-m_{calc})/m*100\%$, where m is the original mass of the sample, $m_{calc}$ is the mass of the calcined sample after heating in the oven, both corrected with the mass of the crucible.]

The mixture was kneaded and shaped by extrusion, and the resulting extrudates were dried at 140° C. for 2 hours and subsequently calcined at 550° C. for 2 hours.

The composition of the catalyst is shown in table 1.

TABLE 1

| Catalyst composition | | | | | | |
|---|---|---|---|---|---|---|
| Composition (wt %) | | | | BET area ($m^2/g$) | Pore volume (mL/g) | Pore diameter (nm) |
| Ni | Cu | $TiO_2$ | Ni:Cu | | | |
| 18.4 | 2 | 74 | 9.2 | 30 | 0.32 | 104 |

The catalyst has been applied for the mild hydrotreatment of pyrolysis oil in a continuous process using three catalyst beds in series at different temperature stages (80° C., 150° C. and 250° C.) and a hydrogen pressure of either 85 bar or 150 bar using a WHSV of 0.5 and a gas flow rate ($H_2$) of 60 NL/hour. The resulting product oil is subjected to treatment in vacuo (100 mbar, 15 minutes with a water bath temperature of 70° C.) giving rise to a distillate fraction (termed 'aqueous phase') and a residue fraction ('organic phase'). The product composition in terms of gases and liquid is given in table 2. Table 3 gives a more detailed overview of the composition of the liquid phase.

TABLE 2

Gases and liquid formed in the mild hydrotreatment of pyrolysis oil in three stages at 80° C., 150° C. and 250° C.

| Gas | |
|---|---|
| Yield (wt %)[a] | 3.21 |
| Composition (wt %)[a] | |
| CO | 0.51 |
| $CH_4$ | 0.09 |
| $C_2H_4$ | 0.05 |
| $C_2H_6$ | 0.08 |
| $C_3H_6$ | 0.04 |
| $C_3H_8$ | 0.06 |
| $CO_2$ | 2.38 |
| Liquid products | |
| Yield (wt %)[b] | 96.79 |

[a]Expressed as (amount of gaseous or liquid products out/pyrolysis oil feed in).
[b]Expressed as 100% - gas yield; formation of small amounts of solids is not taken into account.

TABLE 3

Properties of the liquid product obtained in the mild hydrotreatment of pyrolysis oil in three stages at 80° C., 150° C. and 250° C. Data represent the composition after 72 run hours.

| Total pressure (bar) | 85 | 150 |
|---|---|---|
| Organic phase | | |
| Yield (%) | 54 | 55 |
| Elemental composition (wet, wt %) | | |
| C | 68.75 | 66.74 |
| H | 7.56 | 7.61 |
| O (difference) | 23.69 | 25.65 |

TABLE 3-continued

Properties of the liquid product obtained in the mild hydrotreatment of pyrolysis oil in three stages at 80° C., 150° C. and 250° C. Data represent the composition after 72 run hours.

| | | |
|---|---|---|
| O (dry) | 22.43 | 24.8 |
| Water (wt %) | 1.42 | 0.96 |
| Atomic (H/C; O/C), dry | (1.29; 0.24) | (1.35; 0.28) |
| Aqueous phase | | |
| Yield (%) | 46 | |
| Elemental compostion (wet, wt %) | | |
| C | 6.64 | 6.14 |
| H | 10.3 | 10.32 |
| O (difference) | 83.06 | 83.54 |
| O (dry) | 9.02 | 10.77 |
| Water (wt %) | 83.29 | 81.87 |
| TOC (g C/L) | 93.61 | 83.2 |
| CAN (mg BuO/g) | 55.76 | 51.59 |
| TAN (mg KOH/g) | 65.8 | 59.76 |
| pH | 2.37 | 2.47 |
| Combined phases | | |
| Deoxygenation (%)[a] | 43 | 36 |

[a]Expressed as 100 - (O in product/O in feed).

In a different set of experiments, the upgrading of pyrolysis oil was performed in a continuous process using two catalyst beds in series at different temperature stages (80° C. and 150° C.) and a hydrogen pressure of either 85 bar or 150 bar using a WHSV of 0.5 and a gas flow rate ($H_2$) of 60 NL/hour. In this case a run time of 21 days could be achieved at 85 bar and 24 days at 150 bar. The resulting product oil is subjected to treatment in vacuo (100 mbar, 15 minutes with a water bath temperature of 70° C.) giving rise to a distillate fraction (termed 'aqueous phase') and a residue fraction ('organic phase'). The product composition in terms of gases and liquid is given in table 4. Table 5 gives a more detailed overview of the composition of the liquid phase obtained in the experiments using 85 bar pressure. Table 6 gives a more detailed overview of the composition of the liquid phase obtained in the experiments using 150 bar pressure.

TABLE 4

Gases and liquid formed in the mild hydrotreatment of pyrolysis oil in two stages at 80° C. and 150° C.

| | |
|---|---|
| Gas | |
| Yield (wt %)[a] | 1.26 |
| Composition (wt %)[a] | |
| CO | 0.79 |
| $CH_4$ | 0.07 |
| $C_2H_4$ | 0.03 |
| $C_2H_6$ | 0.06 |
| $C_3H_6$ | 0.05 |
| $C_3H_8$ | 0.12 |
| $CO_2$ | 0.13 |
| Liquid products | |
| Yield (wt %)[b] | 98.74 |

TABLE 4-continued

Gases and liquid formed in the mild hydrotreatment of pyrolysis oil in two stages at 80° C. and 150° C.

| | |
|---|---|
| Composition (%)[c] | |
| Organic phase | 69.9 |
| Aqueous phase | 30.1 |

[a]Expressed as (amount of gaseous or liquid products out/pyrolysis oil feed in).
[b]Expressed as 100% - gas yield; formation of small amounts of solids is not taken into account.
[c]Averaged over runtime; organic + aqueous = 100%

TABLE 5

Properties of the liquid product obtained in the mild hydrotreatment of pyrolysis oil in two stages at 80° C. and 150° C. and 85 bar pressure.

| | Day 4 | Day 8 | Day 12 | Day 16 |
|---|---|---|---|---|
| Organic phase | | | | |
| Yield (%) | 68.5 | 72.5 | 69.2 | 69.3 |
| Elemental composition (wet, wt %) | | | | |
| C | 59.06 | 60.26 | 58.03 | 58.01 |
| H | 6.76 | 6.87 | 6.68 | 6.66 |
| O (difference) | 30.47 | 32.87 | 35.29 | 35.33 |
| O (dry) | 28.50 | 31.96 | 33.35 | 33.77 |
| Water (wt %) | 2.22 | 1.02 | 2.18 | 1.76 |
| Atomic (H/C; O/C), dry | (1.32; 0.41) | (1.34; 0.42) | (1.33; 0.45) | (1.33; 0.43) |
| Aqueous phase | | | | |
| Yield (%) | 31.5 | 27.5 | 30.8 | 30.7 |
| Elemental composition (wet, wt %) | | | | |
| C | 9.32 | 8.47 | 7.75 | 8.13 |
| H | 10.46 | 10.13 | 9.86 | 10.21 |
| O (difference) | 80.22 | 81.4 | 82.39 | 81.66 |
| O (dry) | 9.22 | 12.26 | 10.41 | 9.36 |
| Water (wt %) | 79.88 | 77.78 | 80.97 | 81.34 |
| TOC (g C/L) | 91 | 90.1 | 85.5 | 94.8 |
| CAN (mg BuO/g) | 81.32 | 77.67 | 67.26 | 64.68 |
| TAN (mg KOH/g) | 83.62 | 86.54 | 86.61 | 81.7 |
| pH | 1.93 | 1.87 | 1.84 | 1.94 |
| Combined phases | | | | |
| Deoxygenation (%)[a] | 13.4 | 7.9 | 8.9 | 8.9 |

[a]Expressed as 100 - (O in product/O in feed).

TABLE 6

Properties of the liquid product obtained in the mild hydrotreatment of pyrolysis oil in two stages at 80° C. and 150° C. and 150 bar pressure.

| | Day 4 | Day 8 | Day 12 | Day 16 | Day 20 | Day 24 |
|---|---|---|---|---|---|---|
| Organic phase | | | | | | |
| Yield (%) | 67.3 | 71.9 | 72.3 | 70.8 | 74.5 | 72.0 |
| Elemental composition (wet, wt %) | | | | | | |
| C | 57.46 | 58.37 | 59.87 | 59.13 | 61.02 | 60 |
| H | 6.61 | 6.84 | 6.75 | 6.73 | 6.82 | 6.86 |
| O (difference) | 35.93 | 34.79 | 33.38 | 34.14 | 32.16 | 33.14 |
| O (dry) | 35.93 | 33.65 | 32.62 | 33.76 | 31.53 | 32.28 |
| Water (wt %) | 0 | 1.28 | 0.85 | 0.43 | 0.71 | 0.97 |
| Atomic (H/C;O/C), dry | (1.37; 0.47) | (1.37; 0.43) | (1.33; 0.41) | (1.36; 0.43) | (1.33; 0.39) | (1.35; 0.40) |
| Aqueous phase | | | | | | |
| Yield (%) | 32.7 | 28.1 | 27.7 | 29.2 | 25.5 | 28.0 |
| Elemental composition (wet, wt %) | | | | | | |
| C | 9.95 | 9.55 | 9.08 | 8.38 | 9.17 | 8.50 |
| H | 10.57 | 10.5 | 10.33 | 10.47 | 9.61 | 9.47 |
| O (difference) | 79.48 | 79.95 | 80.59 | 81.15 | 81.22 | 82.03 |
| O (dry) | 9.34 | 9.28 | 17.80 | 10.34 | 12.39 | 10.55 |
| Water (wt %) | 78.91 | 79.5 | 70.64 | 79.66 | 77.43 | 80.41 |
| TOC (g C/L) | 99.1 | 138.7 | 91 | 84.36 | 94.0 | 90.72 |
| CAN (mg BuO/g) | 88.89 | 89.46 | 88.87 | 67.15 | 76.63 | 74.82 |
| TAN (mg KOH/g) | 81.47 | 80.86 | 80.26 | 86.22 | 97.18 | 89.64 |
| pH | 2.01 | 1.99 | 1.94 | 1.96 | 1.91 | 1.94 |
| Combined phases | | | | | | |
| Deoxygenation (%) [a] | 5.6 | 7.1 | 1.2 | 6.6 | 7.6 | 9.2 |

[a] Expressed as 100 − (O in product/O in feed).

The product oils were characterized by $^{13}C$ NMR, which allows identification and quantification of the various functionalities present in the oil. These results are normalized and shown in table 7.

TABLE 7

NMR characterization of the product oils (combined aqueous and organic phase) obtained in the mild hydrotreatment of pyrolysis oil in two stages at 80° C. and 150° C. and either 85 and 150 bar pressure.

| Functionality (area %) | Chemical shift (ppm) | Normalized amount |
|---|---|---|
| Ketone/Aldehyde C═O | 225-190 | 9.70 |
| Acid/Ester C═O | 190-160 | 10.21 |
| Phenolic-OH or -OR | 160-140 | 12.58 |
| Aromatic or olefinic CH | 140-105 | 26.67 |
| Ketal O—CH—O | 105-85 | 2.58 |
| Alcohols/esters/ethers | 85-60 | 18.13 |
| CH aliphatic | 60-5 | 20.14 |
| Total (%) | | 100 |

In another set of experiments the mild upgrading is performed in a continuous process using one catalyst bed at a temperature of 80° C. and a hydrogen pressure of either 85 bar or 150 bar using a WHSV of 0.5 and a gas flow rate ($H_2$) of 60 NL/hour. In this case a run time of at least 26 days could be achieved at both 85 bar and 150 bar. Table 8 gives a more detailed overview of the composition of the liquid phase obtained in the experiments using either 85 bar or 150 bar pressure. Table 8 gives a more detailed overview of the composition of the liquid phase obtained in the experiments using either 85 or 150 bar pressure.

TABLE 8

Properties of the liquid product obtained in the mild hydrotreatment of pyrolysis oil in one stage at 80° C. and either 85 or 150 bar pressure.

| Combined phase | 85 bar | 150 bar |
|---|---|---|
| Elemental composition (wet, wt %) | | |
| C | 45.01 | 45.15 |
| H | 7.27 | 7.08 |
| O (difference) | 47.72 | 47.77 |
| O (dry) | 27.79 | 27.89 |
| Water (wt %) | 22.42 | 22.37 |
| Atomic (H/C; O/C), dry | (1.27; 0.46) | (1.22; 0.45) |

The resulting upgraded pyrolysis oils could all be successfully co-processed with VGO in an FCC riser pilot plant (10 wt % upgraded pyrolysis oil wrt VGO), and the residence time in the reactor was kept at 2 seconds at a catalyst to oil ratio of 8 wt/wt. The oil preheating temperature was set to 240° C. and the reactor temperature was 520° C. The catalyst was regenerated at 690° C.

That which is claimed is:

1. A process for converting a biomass-derived pyrolysis oil comprising:
   (a) comulling (1) a refractory oxide, (2) an amount of liquid, and (3) metal components comprising at least one or more Group VIII metal component(s) and at least one or more Group IB metal component(s) to form a mixture, wherein at least 15% by weight of the metal components is insoluble in the amount of liquid, and wherein the amount of liquid is chosen such that a Loss On Ignition (LOI) at 485° C. of the mixture is from equal to or more than 20 wt % to equal to or less than 70 wt % based on a total weight of the mixture;

(b) shaping, drying and calcining the mixture to provide a catalyst comprising the at least one or more Group VIII metal component(s) and the at least one or more Group IB metal component(s); and (c) contacting a feed comprising the biomass-derived pyrolysis oil with hydrogen at a temperature in the range from 50° C. to 350° C., in the presence of the catalyst, to produce a converted biomass-derived pyrolysis oil.

2. The process of claim 1, wherein a weight ratio of the least one or more Group VIII metal component(s) to the at least one or more Group IB metal component(s) is at least 2:1.

3. The process of claim 1, wherein the refractory oxide comprises titania.

4. The process of claim 1, wherein the liquid is selected from water, ammonia, alcohols, ketones, aldehydes, and aromatic solvents.

5. The process of claim 1, wherein at least 20% by weight of the metal component(s) is insoluble in the amount of liquid.

6. The process of claim 1, wherein the converted biomass-derived pyrolysis oil is converted further via one or more hydrocarbon conversion processes into one or more chemical components.

7. The process of claim 1, wherein the catalyst comprises the at least one or more Group VIII metal component(s) in an amount such that a Group VIII metal(s) is present in the catalyst in an amount equal to or more than 12 wt %, based on the total weight of the catalyst.

8. The process of claim 7, wherein the catalyst comprises the at least one or more Group VIII metal component(s) in an amount such that the Group VIII metal(s) is present in the catalyst in an amount equal to or less than 80 wt %, based on the total weight of the catalyst.

9. The process of claim 1, wherein the at least one or more Group 1B metal component(s) comprise copper or a copper component.

10. The process of claim 1, wherein the at least one or more Group VIII metal component(s) comprise nickel or a nickel component.

11. The process of claim 1, wherein the catalyst contains no Group VIB metal(s).

12. A process for converting a biomass-derived pyrolysis oil comprising:

(a) comulling (1) a refractory oxide, (2) an amount of liquid, and (3) metal components comprising at least one or more Group VIII metal component(s) and at least one or more Group IB metal component(s) to form a mixture, wherein the at least one or more Group VIII metal component(s) comprise nickel or a nickel component, wherein at least 15% by weight of the metal components is insoluble in the amount of liquid, and wherein the amount of liquid is chosen such that a Loss On Ignition (LOI) at 485° C. of the mixture is from equal to or more than 20 wt % to equal to or less than 70 wt % based on a total weight of the mixture;

(b) shaping, drying and calcining the mixture to provide a catalyst comprising the at least one or more Group VIII metal component(s) and the at least one or more Group IB metal component(s); and (c) contacting a feed comprising the biomass-derived pyrolysis oil with hydrogen at a temperature in the range from 50° C. to 350° C., in the presence of the catalyst, to produce a converted biomass-derived pyrolysis oil.

13. The process of claim 12, wherein the at least one or more Group IB metal component(s) comprise copper or a copper component.

14. The process of claim 12, wherein a weight ratio of the least one or more Group VIII metal component(s) to the at least one or more Group IB metal component(s) is from 2:1 to 15:1.

15. The process of claim 12, wherein the catalyst comprises the at least one or more Group VIII metal component(s) in an amount such that a Group VIII metal(s) is present in the catalyst in an amount equal to or more than 12 wt %, based on the total weight of the catalyst.

16. The process of claim 12, wherein at least 20% by weight of the metal component(s) is insoluble in the amount of liquid.

17. A process for converting a biomass-derived pyrolysis oil comprising:

(a) comulling (1) a refractory oxide, (2) an amount of liquid, and (3) metal components comprising at least one or more Group VIII metal component(s) and at least one or more Group IB metal component(s) to form a mixture, wherein the at least one or more Group VIII metal component(s) comprise nickel or a nickel compound, wherein the at least one or more Group IB metal component(s) comprise copper or a copper component, wherein at least 15% by weight of the metal components is insoluble in the amount of liquid, and wherein the amount of liquid is chosen such that a Loss On Ignition (LOI) at 485° C. of the mixture is from equal to or more than 20 wt % to equal to or less than 70 wt % based on a total weight of the mixture;

(b) shaping, drying and calcining the mixture to provide a catalyst comprising the at least one or more Group VIII metal component(s) and the at least one or more Group IB metal component(s); and (c) contacting a feed comprising the biomass-derived pyrolysis oil with hydrogen at a temperature in the range from 50° C. to 350° C., in the presence of the catalyst, to produce a converted biomass-derived pyrolysis oil.

18. The process of claim 17, wherein the catalyst contains no Group VIB metal(s).

19. The process of claim 17, wherein at least 20% by weight of the metal component(s) is insoluble in the amount of liquid.

20. The process of claim 17, wherein the catalyst comprises the at least one or more Group VIII metal component(s) in an amount such that a Group VIII metal(s) is present in the catalyst in an amount equal to or more than 12 wt %, based on the total weight of the catalyst.

21. The process of claim 17, wherein a weight ratio of the least one or more Group VIII metal component(s) to the at least one or more Group IB metal component(s) is from 2:1 to 15:1.

* * * * *